United States Patent [19]

Hori et al.

[11] Patent Number: 4,746,638
[45] Date of Patent: May 24, 1988

[54] ALUMINA-TITANIA COMPOSITE POWDER AND PROCESS FOR PREPARING THE SAME

[75] Inventors: Saburo Hori; Yoshio Ishii, both of Iwaki, Japan

[73] Assignee: Kureha Chemical Industry Co., Ltd., Tokyo, Japan

[21] Appl. No.: 912,512

[22] Filed: Sep. 26, 1986

[30] Foreign Application Priority Data

Sep. 27, 1985 [JP] Japan .............................. 60-214237

[51] Int. Cl.$^4$ ....................... C04B 35/10; C01G 23/07
[52] U.S. Cl. .................................. 501/127; 501/153; 423/613
[58] Field of Search ............... 501/127, 153; 423/610, 423/611, 612, 613, 76

[56] References Cited

U.S. PATENT DOCUMENTS

| 3,361,525 | 10/1962 | DeRyeke et al. | 423/613 |
| 3,403,001 | 7/1963 | Mas et al. | 423/613 |
| 3,486,913 | 12/1969 | Zirngibl et al. | 423/613 |
| 3,505,091 | 4/1970 | Santes | 423/613 |
| 3,734,761 | 1/1971 | Becker et al. | 423/613 |
| 4,053,577 | 10/1977 | Arkless | 423/613 |
| 4,491,482 | 1/1985 | Hori | 264/60 X |
| 4,532,224 | 7/1985 | Hori | 501/105 |
| 4,591,471 | 5/1986 | Hori | 423/76 |

FOREIGN PATENT DOCUMENTS 0791038 7/1968 Canada .............................. 423/613

OTHER PUBLICATIONS

Gani et al., "The Structure of Plasma-Prepared Al$_2$O$_3$-TiO$_2$ Powders", Journal of Material Science, vol. 15, pp. 1915–1925, (1980).

Slepetys et al., "Solid Solution of Aluminum Oxide in Rutile Titanium Dioxide", The Journal of Physical Chemistry, vol. 73, No. 7., pp. 2157–2163, (Jul. 1969).

Primary Examiner—William R. Dixon, Jr.
Assistant Examiner—James M. Hunter, Jr.
Attorney, Agent, or Firm—Lowe, Price, LeBlanc, Becker & Shur

[57] ABSTRACT

Alumina-titania composite powder comprising spherical particles each of which contains about 30 to 80 wt % of γ- phase or δ-phase alumina and about 70 to 20 wt % of titania comprising rutile-phase in the majority and is substantially free from X-phase (3Al$_2$O$_3$-TiO$_2$) and aluminum titanate-phase. These alumina-titania composite powders are prepared by blowing a vapor mixture of AlCl$_3$ and TiCl$_4$ into a burning flame to effect oxidation, which is characterized in that a temperature of a mixing section, where a combustible gas, an oxidizing gas, AlCl$_3$ gas, TiCl$_4$ gas and a carrier gas are mixed and subjected to combustion, is kept at about 1450° C. or higher and lower than a melting point of aluminum titanate; a temperature of an outlet portion of a reacting section connected to the mixing section is kept at about 800° C. or higher; and an average total gas retention time in the mixing section and the reacting section are 20 to 500 msec.

6 Claims, 4 Drawing Sheets

ALUMINA-TITANIA COMPOSITE POWDER AND PROCESS FOR PREPARING THE SAME

BACKGROUND OF THE INVENTION

1. Field of the Invention

This invention relates to easily-sinterable alumina-titania composite powder for use as starting materials of aluminum titanate ceramics which have a high mechanical strength and a low thermal coefficient of expansion.

2. Prior Arts

Aluminum titanate ($Al_2TiO_5$) has been long known as a ceramic of low thermal expansivity. This low thermal expansivity is said to be afforded by cracks caused in particles due to significant anisotropy in thermal expansivity of aluminum titanate crystals. These cracks, however, also act adversely to reduce the strength of aluminum titanate, restricting the application use thereof.

Conventional processes for preparing aluminum titanate are generally classified, by form of starting materials to be employed, into three: (i) a process in which powders of alumina ($Al_2O_3$) and titania ($TiO_2$) are used as starting materials in the form of a mixture; (ii) a process in which aluminum titanate synthesized is used after breaking; and (iii) a process in which composite powders of $Al_2O_3$-$TiO_2$ prepared by oxidation of halides of aluminum and titanium in a gaseous phase are employed as starting materials.

Sintered bodies prepared from the powder mixture as specified in (i) above are low in density, although it may be improved to some extent by selecting $Al_2O_3$ and $TiO_2$ feedstocks. The sintered bodies are also poor in strength because they show domain structure in which $Al_2TiO_5$ crystals grow, causing large cracks therein. It has been reported that the domain can be reduced and the bending strength can be improved by carrying out the sintering at a high rate or by preliminarily adding a small amount of aluminum titanate to the mixture. However, the effect is not so noticeable and the attained highest strength is still as low as 2 $Kg/mm^2$ (Kenya Hamano et al., "Yogyo-kyokai-shi," 91 (2) 94–101 (1983)), which is not satisfactory.

In the case that the aluminum titanate powders as specified in (ii) above are employed, it has been known that the obtained sintered bodies have no domain structure and that the particle diameters of the sintered bodies are reduced and the bending strengths thereof are improved if $Al_2O_3$ particles chipped from $Al_2O_3$ milling balls are allowed to be mixed into the materials during a long ball-milling operation by the ball mill. For example, when the materials are sintered at a low temperature of 1300° C. for a long time of 8 hours, the obtained sintered bodies have a high bending strength of 8.6 $Kg/mm^2$. However, the coefficient of thermal expansion is as high as about 0.4% between room temperature and 1000° C. In addition, the density of the sintered bodies is as low as 82% of the theoretical density. In contrast, when the materials are sintered at a high temperature of 1500° C. for about 4 hours, the coefficient of thermal expansion is as low as 0.1% between room temperature and 1000° C. and the density is relatively high, 94% of the theoretical density. However, the strength is not satisfactory. The bending strenth is 5 to 6 $Kg/mm^2$ at highest (Yutaka Ohya et al., "Yogyo-kyokai-shi," 91 (6) 289–97(1983)).

There is a report that relatively high strength can be attained when a third component such as MgO, $SiO_2$ and $ZrO_2$ is added to the powders of (i) or (ii) above (Kenya Hamano et al., "Nippon Kagakukai-shi," (10) 1647–55(1981)). In this case, however, the strength is still unsatisfactory. The attainable highest bending strength is 5 to 6 $Kg/mm^2$.

The above-mentioned process (iii) for/preparing $Al_2O_3$-$TiO_2$ composite powder through oxidation of aluminum and titanium halides in a vapour phase includes an r.f. plasma method proposed by Gani et al. and a method using a tubular reactor proposed by Tokunaga et al. The composite powder obtained by Gani et al. have an average particle diameter of 30 to 170 nm and crystalline forms such as $\delta$-$Al_2O_3$ within a range in which $Al_2O_3$ is major and rutile-$TiO_2$ within a range in which $TiO_2$ is major, and intermediate phases such as $\beta$-$Al_2O_5$ in the case where the molar ratio of $Al_2O_3$ to $TiO_2$ is around 1:1 and X-phase together with $\delta$-$Al_2O_3$ in the case where the molar ratio is around 3:1 (Gani et al., Journal of Materials Science, Vol. 15, 1915–1925 (1980)).

In the composite powders of Tokunaga et al., $Al_2O_3$ is amorphous and $TiO_2$ is in the form of anatase when $Al_2O_3$ is little and rutile when $Al_2O_3$ is in a considerable amount. Under the conditions in which the reaction temperature is 1000° C. or higher and the molar % of $Al_2O_3$ is 20 or higher, -$Al_2TiO_5$ is detected (Tokunaga et al., "Nippon Kagakukaishi," (11) 1758–1762 (1982)).

According to the plasma method, the particles are formed by crystallization after they have been once molten, taking a course of a vapor phase→a liquid phase→a solid phase. Whereas, according to the method using the tubular reactor, crystallization occurs directly from the vapor phase. Although these two methods differ in produced crystalline phases due to the difference in reaction temperatures and crystallization mechanisms (through or not through a liquid phase), either of Gani et al. or Tokunaga et al. produce aluminum titanate ($Al_2TiO_5$) as a major crystalline phase around the molar ratio of 1:1.

When such $Al_2O_3$-$TiO_2$ powder is used, they can not afford sufficient strength to the sintered bodies.

OBJECTS OF THE INVENTION

As described above, composite powders, which can afford both a high strength and a low thermal expansivity simultaneously, have not yet been provided.

It is therefore a primary object of the present invention to provide composite powders and a process for preparing the same, which are easily sinterable at a low temperature and for a short time and suitable as starting materials for preparing sintered bodies having both a high strength and low coefficient of thermal expansion which have not been attained by conventional powders used as starting materials for aluminum titanate.

It is another object of the present invention to provide composite powders and a process for preparing the same, which are suitable as starting materials for aluminum titanate ceramic sintered bodies enjoying a bending strength of 8 $Kg/mm^2$ or higher, preferably 10 $Kg/mm^2$ or higher and a thermal expansivity of 0.2% or less between room temperature and 1000° C.

SUMMARY OF THE INVENTION

The present invention has been achieved based on a finding that when composite powder comprises particles each of which contains about 30 to about 80 wt % of alumina ($Al_2O_3$) and about 70 to about 20 wt % of titania ($TiO_2$) therein and contains substantially no aluminum titanate and X-phase ($3Al_2O_3\text{-}TiO_2$) and contains $\gamma$-phase or $\delta$-phase $Al_2O_3$ and rutile-phase $TiO_2$ as a major phase, ceramics comprising aluminum titanate as a main component high in a strength and low in a thermal expansivity can be obtained by sintering at a lower temperature than the conventional material or for a shortened sintering time when the conventional higher sintering temperature is employed.

More specifically, the present invention features alumina-titania composite powder comprising particles each of which contains about 30 to about 80 wt % of $\gamma$-phase and $\delta$-phase alumina and about 70 to about 20 wt % of titania whose major crystalline phase is rutile and is substantially free from X-phase ($3Al_2O_3\text{-}TiO_2$) and aluminum titanate phase.

In this connection, it is to be noted that "whose major crystalline phase is rutile" means here that integrated strength ratio of X-diffraction peaks of rutile (1 1 0) and anatase (1 0 1) is larger than 2:1. It is meant by "is substantially free from X-phase" that X-phase is not detected by an X-ray diffractometry and it is meant by "is substantially free from aluminum titanate" that aluminum titanate phase is observed only at a main peak even when it is detected.

It has also been found that the composite powder as described above can be prepared under specific conditions as given below.

The present invention further features a process for preparing alumina-titania composite powder by blowing a vapor mixture of $AlCl_3$ and $TiCl_4$ into a burning flame to effect oxidation, which is characterized in that a temperature of a mixing section, where a combustible gas, an oxidizing gas, $AlCl_3$ gas, $TiCl_4$ gas and a carrier gas are mixed and subjected to combustion, is kept at about 1450° C. or higher and lower than a melting point of aluminum titanate; a temperature of an outlet portion of a reacting section connected to the mixing section is kept at about 800° C. or higher; and an average total gas retention time in the mixing section and the reacting section is 20 to 500 msec.

DETAILED DESCRIPTION OF THE INVENTION

The composite powders of the present invention will first be described.

Each particle of the composite powders according to the present invention contains, therein, both $Al_2O_3$ and $TiO_2$, respectively. This structure can develop an easily-sinterable characteristic of $TiO_2$, which is sinterable at a lower temperature as compared with $Al_2O_3$ more effectively than a mixture system of particles consisting merely of $Al_2O_3$ and particles consisting merely of $TiO_2$. Thus, the sintering behaviors of the composite powders are controlled by $TiO_2$ and the sinterability is highly enhanced.

It can be confirmed, by a transmission electron microscope having an analyzing function, that each of the powder particles contain, therein, both $Al_2O_3$ and $TiO_2$.

An average particle diameter of the composite powders is preferably 25 to 100 nm. If the average particle diameter is smaller than the above-specified range, a surface area is increased. As a result of this, agglomeration of particles easily occurs and absorbed water is increased. By these reasons, when the powders having an average particle diameter smaller than the specified range are used as the starting materials, it is difficult to obtain sintered materials of high density. Whereas, if the average particle diameter is larger than the specified range, the sinterability is lowered.

The average particle diameter may be obtained by measuring sizes of 200 or more particles in the transmission electron micrograph.

$Al_2O_3$ constituting the composite powder of the present invention comprises $\gamma$-phase and/or $\delta$-phase $Al_2O_3$, and the amount of $\alpha$-phase or amorphous phase $Al_2O_3$ is small or minimized. The reasons for the preference of $Al_2O_3$ phase are explained below.

The presence of $\alpha$-phase $Al_2O_3$ is a result of transformation of metastable crystalline forms ($\gamma$, $\delta$ or $\theta$) to $\alpha$-form, which almost always accompanies a material transport into large porous agglomerates. A powder containing these agglomerates in a large amount cannot be molded densely, and therefore the powder is undesirable as a starting powder for sintering.

In the case where no crystalline phase is detected for $Al_2O_3$, i.e., where a large amount of amorphous phase $Al_2O_3$ is contained, a considerable amount of water is absorbed. Therefore, the net density of the molded bodies, in which water is absorbed, is low, so that it is not possible to afford dense sintered bodies.

In contrast, the $\gamma$-phase or $\delta$-phase $Al_2O_3$ causes little agglomeration and water absorption, which assures good results.

By these reasons, $Al_2O_3$ substantially free from $\alpha$-phase is most preferable. In this connection, it is meant by "substantially free from $\alpha$-phase" that the integrated strength of the X-ray diffraction peak (distance between planes: 2.085A) of (1 1 3) plane of $\alpha$-phase $Al_2O_3$ is $\frac{1}{4}$ or less of the integrated strength of the X-ray diffraction peak (distance between planes: 1.97 to 1.99 A) of (4 0 0) plane of $\gamma$-phase $Al_2O_3$ or (4 0 0) plane of $\delta$-phase $Al_2O_3$.

The $Al_2O_3$ content is suitably within a range of about 30 to about 80 wt %. If the content is out of the range, sintered bodies composed mainly of aluminum titanate can not be produced any more and the coefficient of thermal expansion is raised.

In particular, the composite powders whose $Al_2O_3$ content is larger than the stoichiometric ratio of aluminum titanate and no more than about 75 wt % and whose $TiO_2$ content is about 40 to 20 wt %, or the composite powders whose $TiO_2$ content is larger than the stoichiometric ratio of aluminum titanate and no more than about 60 wt % and whose $Al_2O_3$ content is about 52 to 35 wt % are preferable, because they can afford the sintered bodies with uniformly dispersed excess $Al_2O_3$ or $TiO_2$ on aluminum titanate grain boundaries which results in a remarkably improved strength.

Another component of the composite powders, i.e., $TiO_2$ comprises rutile-phase in majority. When $TiO_2$ is present in the form of an anatase, it indicates that the composition of $TiO_2$ is not uniformly mixed with $Al_2O_3$. When a considerably large amount of anatase-phase $TiO_2$ is present, desired sinterability can not be assured.

The crystallite diameter of rutile-phase is preferred to be smaller than both of the average particle diameter of the composite powders and 30 nm. It is further preferred that the crystallites be present as many as possible in each of the particles of the composite powders to enhance the sinterability. The average crystallite diameter as specified above is determined according to Scherrer's equation by correcting the half value width of the diffraction peak of (1 1 0) plane of the rutile-phase $TiO_2$ by (1 1 1) peak of silicon added as an internal standard.

The lattice constant $C_o$ of the rutile-phase crystal is preferred to be smaller than 2.9592 Å (JCPDS21-1276) of pure rutile and further preferred to be 2.9580 Å or less. In these cases, not only rutile-phase $TiO_2$ crystallites are contained within respective particles, but a partial solid solution of $Al_2O_3$ into $TiO_2$ is achieved. This is considered to enhance the sinterability.

The amount of solute $Al_2O_3$ is about 0.5 wt % or more when $C_o$ is 2.9580 A or less in view of Slepetys et al. (R. A. Slepetys and P. A. Vaughan, J. Phys. Chem., 73 2157–62 (1969)).

The determination of the lattice constant is made by obtaining $\alpha$-spacings of the diffraction peaks of plural (4 or more) rutile-phase $TiO_2$ by an X-ray diffractometry in which silicon is used as an internal standard and by calculating according to the least squares method.

The content of $TiO_2$ is generally within a range of about 70 to 20 wt %. If the content is out of the range, the composite powders can not afford the sintered bodies consisting mainly of aluminum titanate any more and the coefficient of thermal expansion is raised.

The contents of $Al_2O_3$ and $TiO_2$ are determined by ICP emission spectroscopy analysis with Y (yttrium) used as an internal standard after alkali-fusing the powders and solving it into nitric acid solution.

It is desirable that the composite powders of the present invention comprise a system consisting only of alumina and titania. However, $SiO_2$, $MgO$, $ZrO_2$, etc. may additionally be contained in such amounts as impurities. Without any one of these, the composite powders of the present invention can have an improved sinterability as compared with the conventional starting powder materials for aluminum titanate, even with $SiO_2$, $MgO$ or $ZrO_2$. Sintered bodies of a high density can be obtained according to the present invention, without these additives.

The composite powders of the present invention are substantially free from X-phase ($3Al_2O_3$-$TiO_2$) and aluminum titanate ($Al_2TiO_5$). The definition of "substantially free from" is as given before.

$TiO_2$, which can enhance a sinterability, is captured in the form of $3Al_2O_3$-$TiO_2$ or $Al_2TiO_5$ leading to lower sinterability. However, if the contents of these phases are little, there is caused no significant problem. Therefore, it does not matter unless these phases are contained in substantial amounts.

The composite powder of the present invention preferably has a configuration of a sphere. The spherical configuration can be obtained under the specific preparation conditions as described below.

A process for preparing the composite powder of the present invention will now be described.

Figure 1:
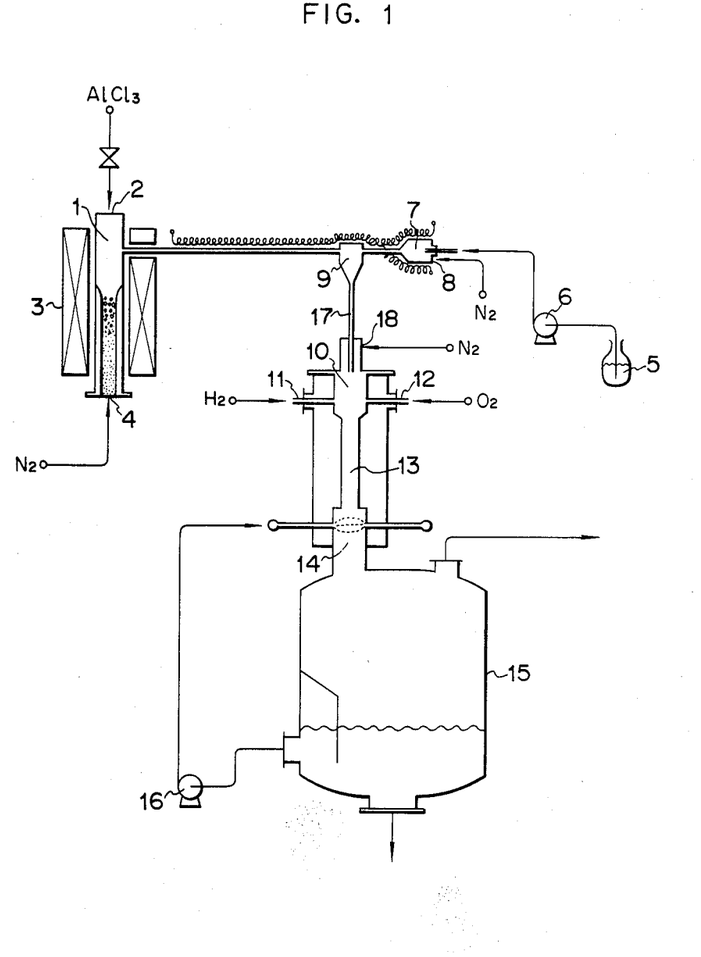
FIG. 1 is a flow sheet showing a process and apparatus for preparing alumina-titania composite powder according to the present invention.

The $Al_2O_3$-$TiO_2$ composite powder of the present invention is prepared, for example, by a process and an apparatus as illustrated in FIG. 1. The process will be described referring to the flow sheet.

The feedstocks employable in the present invention include aluminum compounds and titanium compounds which are vaporized at a relatively low temperature. Among these, anhydrous aluminum chloride ($AlCl_3$) and titanium tetrachloride ($TiCl_4$) are preferred because of their proper vaporization temperatures and easiness in the treatment or disposal of by-products.

$AlCl_3$ is a solid at room temperature and has a sublimating point of about 180° C. A vaporizer 1 of fluidized bed type usin $Al_2O_3$ particles the fluidized medium is employed. $AlCl_3$ is continuously or intermittently supplied from the upper part 2 of the vaporizer. The temperature of the vaporizer 1 is kept constant by an electric furnace 3. The feeding amount of $AlCl_3$ vapor into a reactor is determined by a vapor pressure of $AlCl_3$ and a flow rate of nitrogen gas ($N_2$) which is a carrier gas of $AlCl_3$ blown in from the bottom 4 of the fluidized bed.

Since $TiCl_4$ is liquid at room temperature, it is supplied from a $TiCl_4$ reservoir 5 at a constant rate by a pump 6. $TiCl_4$ is vaporized by a vaporizer 7 which is kept at a temperature higher than a boiling point of $TiCl_4$, for example, by a ribbon heater and mixed with $N_2$ which is a carrier gas of $TiCl_4$ blown through a gas inlet 8.

A mixture of $AlCl_3$ and the carrier gas $N_2$ and a mixture of $TiCl_4$ and the carrier gas $N_2$ are fed into a mixing vessel 9 through tubes heated by some suitable heater such as a ribbon heater to a temperature high enough to prevent crystallization and/or condensation of $AlCl_3$ and $TiCl_4$, preferably to a temperature as high as 300° C. or higher. These gas mixtures are mixed in the mixing vessel 9 and blown into a mixing section 10 of the reactor.

Hydrogen ($H_2$) and oxygen ($O_2$) are also blown into the mixing section 10 through a gas inlet 11 and a gas inlet 12, respectively, to make a whirling flame extending horizontally. The mixing section 10 is kept at a temperature no lower than 1450° C. and lower than the melting point of aluminum titanate. If the mixing section 10 is lower than this specific temperature range, crystallization of aluminum titanate does not proceed well, which increases an amorphous phase and deteriorates the sinterability. On the other hand, if the mixing section 10 is at a temperature higher than the temperature range, the products experience a molten state, which causes fusing of particles to each other. The powders thus produced can not have a good dispersibility required for molding. The temperature range is preferably about 1550° to about 1700° C. It is noted that measuring temperatures of the reactive gases is difficult because the atmosphere contains corrosive gases. Therefore, the apparatus is operated with $H_2$, $O_2$ and $N_2$ flowing without feeding chlorides to obtain a relation between the reactive gas temperature and the refractory temperature by a thermocouple inserted in the reactive gas and a thermocouple embedded in a refractory lining of the reactor, so that the reactive gas temperature when chlorides are fed may be estimated from the refractory temperature.

The gas mixtures which have been mixed at the mixing section 10 and partially reacted are guided downstream to an elongated reacting section 13 to continue and complete the reaction.

The temperature of the reacting section 13 is kept about 800° C. or higher even at an end portion of the reacting section 13. If the temperature is lower than about 800° C., an oxidation reaction rate of $AlCl_3$, in especial, is considered to be lowered.

A total residence time of the gas in the mixing section 10 and the reacting section 13 is not less than 20 msec and not more than 500 msec. It is preferably not less than 40 msec and not more than 200 msec. If the residence time is too short, the reaction can not be completed and if the residence time is too long, the agglomeration of the particles becomes significant, deteriorating the sinterability of the powders.

The powders contained in the gas leaving the reacting section 13 may be collected in a dry form or collected in a solvent such as water. However, even when the powders are collected in a dry form, they must be dispersed in water to eliminate foreign matters or coarse grits. Besides, the collecting efficiency is higher in the method of collecting in water. By these reasons, it is preferred to collect the powders in water.

The gas leaving the reacting section 13 is cooled substantially to room temperature at a quenching section 14. The quenching is carried out by pressurizing a suspension from a bottom of a separating drum 15 and spraying it to the quenching section 14 by a pump 16.

The separating drum 15 effects gas-liquid separation.

The major portion of the $Al_2O_3$-$TiO_2$ composite powder produced by the reaction is collected in water through the contact with water at the quenching section and the composite powders produced are drawn out from the bottom of the separating drum 15 as a slurry.

In addition, it is to be noted that the gas mixture is blown from the mixing vessel 9 to the mixing section 10 through a blowing nozzle 17 and it is preferred that $N_2$ for protecting the blowing nozzle be blown in from the outside 18 of the nozzle 17 to prevent clogging of the nozzle.

A pretreatment to be carried out prior to molding in the production of ceramic molded sintered bodies from the composite powders prepared in an above-described manner will now be described.

In general, dry isostatic pressing technique, slip casting technique, injection molding technique, and doctor blade technique, etc. may be employed to prepare uniform molded bodies from ceramic fine powders. These techniques may also be applicable to the alumina-titania composite powders.

Prior to the molding, various pretreatments suited to the respective molding techniques are made for the powders. The pretreatment is necessary for obtaining uniform molded bodies of high density and high strength. These pretreatments include, for example, a treatment for making some proper granulation, a treatment for improving slippage between the particles to increase the packing density by adding a plasticizer, or a treatment for improving the strength by using a binder.

The pretreatment by the isostatic technique will now be described exemplarily.

The $Al_2O_3$-$TiO_2$ composite powders prepared according to the present invention are generally collected in water and drawn out from the apparatus in the form of a suspenion slurry. Since the slurry is strongly acidic, the powder settles after standing and separates from the supernatant. Alternatively, the powders may settle by centrifugal separation. After removing the supernatant, an appropriate amount of distilled water is added to the separated powders to adjust pH and a concentration of a solid content. Thereafter, supersonic vibration is given to the resultant slurry to uniformly disperse the powders in water. When pH is 2 to 3 and the concentration of the solid content in the slurry is 10 wt % or less, desirable dispersion is obtained. The slurry is subjected to suction filtration by using a quantitative filter paper 5A (nominal opening size: 7 $\mu$m). Through this operation, foreign matters or coarse particles present in the slurry are removed.

The filtrate which passed through the quantitative filter paper is subjected to centrifugal separation to separate solids from a liquid. The resultant cake is dried at a relativaely low temperature, for example, at a temperature of 80° C. The filtrate may alternatively be freeze-dried without being subjected to centrifugal separation. This also affords good results. The powders obtained after drying of the cake are calcined at a temperature of 700° to 900° C. Through the calcination, chloride ions are removed and slight crystalline phase transformation is caused. As a result of this, anatase phase of $TiO_2$ decreases and rutile phase increases. In addition, the diameter of the rutile-phase crystallite increases a little. Crystallization of $Al_2O_3$ proceeds from $\gamma$-phase to $\delta$-phase. In the calcination, if the temperature is lower than 700° C., there is not afforded any special effect by the calcination. In contrast, if the calcination is carried out at a temperature exceeding 900° C., the crystalline transformation will proceed excessively to accelerate the transformation of $Al_2O_3$ into $\alpha$-phase and increase, the diameter of the rutile-phase crystallite of $TiO_2$. In addition, $Al_2O_3$ which is metastably dissolved in $TiO_2$ of rutile-phase is expelled from $TiO_2$ so that the uniformity of mixture of $Al_2O_3$ and $TiO_2$ is lowered. Furthermore, the crystalline transformation is accompanied by adhesion between the particles and sintering. This makes the powders undesirable for use as a sintering material.

Elimination of chloride ions may alternatively be effected by repeating a series of operations comprising dispersion of the cake into distilled water and centrifugal separation to recover the cake, without carrying out calcination. This process, however, is complicated and tedious. The elimination of chloride ions is preferred, but the powders of the present invention have much improved sinterability as compared with the conventional powders even without carrying out the elimination of chloride ions.

The powders after calcination are preferably subjected to a wet ball-milling. The purpose of the ball-milling is to break slightly aggregated particles formed during the calcination, to improve the sinterability by a mechanochemical effect, and to uniformly distribute additives to the surfaces of the powders to prevent agglomeration during drying and improve slippage in molding. The effects can be obtained by a ball-milling of one hour or so, but the milling time is preferably longer to obtain better results.

The slurry subjected to the ball-milling is dried and sieved to render the resultant powder particles smaller.

The particles are charged into a vessel and subjected to rotataion of 10 to 30 rpm for 20 to 40 hours to granulate them. By this operation, relatively round and moderately agglomerated granulated particles of 10 to 50 um are formed. When these granulated particles are used, a higher molding density of molded bodies and a higher density of sintered bodies can be afforded as compared with the case where no granulating operation is carried out.

The granulation may alternatively be effected by a standard spray drying technique, but in this case, the molding density of the molded bodies and density of the sintered bodies are a little lowered as compared with the former case. The molding is effected in such a way that the particles are lightly pressed by a unidirectional pressing apparatus into shapes of bar specimen or pellet and then they are packed into a rubber tube to be molded by isostatic pressing (rubber pressing).

A process for preparing sintered bodies containing aluminum titanate from the $Al_2O_3$-$TiO_2$ composite powders of the present invention will now be described.

The microstructure and the mechanical properties of the sintered bodies are varied with sintering conditions. In this respect, rates of temperature increase and decrease, namely, heating and cooling rates, a highest sintering temperature, and a holding time at highest sintering temperature are important among the sintering conditions.

With respect to the rates of temperature increase and decrease, a rate of temperature increase between 1000° and 1300° C. is important and this rate is preferably 200° to 1000° C./h. If the rate of temperature increase is lower than 200° C./h, relatively dense sintered bodies comprising α-phase $Al_2O_3$ and rutile-phase $TiO_2$ are obtained at a temperature lower than 1300° C. or so before aluminum titanate is produced. Once the dense structure comprising α-phase $Al_2O_3$ and rutile $TiO_2$ is formed, the sintered alminum titanate produced successively by the reaction between $Al_2O_3$ and $TiO_2$ at higher temperatures becomes lower in density and large in domain size, as compared with sintered bodies obtained at a proper heating rate.

If the rate of temperature rise is higher than 1000° C./h, a temperature difference is produced within the sample so that defects, such as cracking, are caused by thermal stress or shrinkage due to ununiform sintering, which lowers the mechanical properties.

The highest temperature for sinterning and the retention time for holding the highest temperature give influences upon the density and the growth of the aluminum titanate crystals. Since the $Al_2O_3$-$TiO_2$ composite powder of the present invention has an excellent sinterability, it is not needed to improve the density to raise the temperature and extend the time. The highest temperature for sintering and the retention time are suitably selected so that the aluminum titanate crystals may grow properly and desired mechanical strength and expansivity may be obtained. As to a sintering temperature, if it is lower than about 1300° C., the aluminum titanate crystals can not grow sufficiently and the expansivity can not be sufficiently low. By this reason, the sintering temperature is needed to be about 1300° C. or higher. If the composite powder has a composition similar to stoichiometric ratio, the crystals grow rapidly, so that a comparatively low highest sintering temperature and a short retention time, for example, 1400° C. for one hour, or 1500° C. for 20 minutes, are preferred. If the composite powder has a composition largely deviated from the stoichiometric ratio and in especial, $Al_2O_3$ is largely excessive, a comparatively high sintering temperature and a long retention time, for example, 1500° C. for four hours, or 1600° C. for one hour, are preferred.

EXAMPLE 1

$Al_2O_3$-$TiO_2$ composite powders were prepared according to the conditions as given below and by employing the process and apparatus as illustrated in FIG. 1.

Sizes of Principal Sections

Mixing Section: inner diameter 50 mm, length 60 mm
Contracting Section: reduced in diameter over a length of 20 mm from 50 mm of the inner diameter of the mixing section to 30 mm of the inner diameter of the reacting section
Reacting Section: inner diameter 30 mm, length 200 mm Preparing Conditions $AlCl_3$ vaporizer temperature: 150° C.
$AlCl_3$ carrier $N_2$: 0.42 $Nm^3/h$
Fed amount of $AlCl_3$: 100g/h
Fed amount of $TiCl_4$: 55 g/h
$TiCl_4$ carrier $N_2$: 0.40 $Nm^3/h$
$N_2$ for blowing nozzle: 0.10 $Nm^3/h$
$H_2$ for burner: 0.8 $Nm_3/h$
$O_2$ for burner: 0.9 $Nm_3/h$
Pressure: normal pressure
Mixing section temp.: 1600° C.
Reacting section exit temp.: 980° C.
Retention time in mixing section: 25 msec
Retention time in reacting section: 50 msec The operation of the apparatus was carried out for two hours and the resultant slurry was recovered from the separating drum. The recovered cake was dried at a temperature of 80° C. and the obtained powders were subjected to a pretreatment of calcination. The calcination was carried out at 800° C. for one hour. 75 g of $Al_2O_3$-$TiO_2$ powders were finally obtained. The powders had a formation of 61.8 wt % of $Al_2O_3$ and 38.2 wt % of $TiO_2$. It was confirmed that each of the particles contained $Al_2O_3$ and $TiO_2$.

Figure 2:
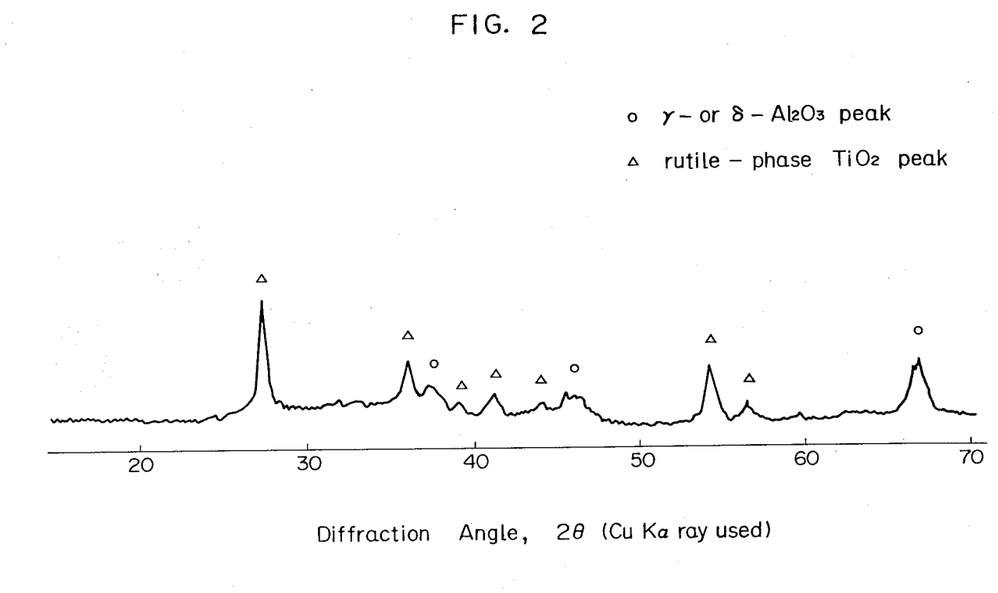
FIG. 2 is an X-ray diffraction pattern of alumina-titania composite powder prepared in Example 1 after calcination.

The X-ray diffraction pattern of the powders is shown in FIG. 2. Detected peaks were rutile-phase of $TiO_2$ and γ-phase or δ-phase of $Al_2O_3$. A weak peak of δ-phase was also observed, but X-phase and aluminum titanate-phase were not observed.

In the case where the powders were not subjected to a preliminary calcination, the peak of the rutile-phase was rather wider as compared with the peak after calcination and some $TiO_2$ of anatase-phase was also detected. A diameter of a crystallite was obtained from a half-value width of (1 1 0) peak of the rutile-phase. The diameter of the crystallite was 18 nm. Whereas, the diameter of crystallite before the calcination was 9.4 nm. The lattice constant of the rutile-phase crystals was 2.9565 Å and it was deviated remarkably from the standard value 2.9592 Å.

Figure 3:
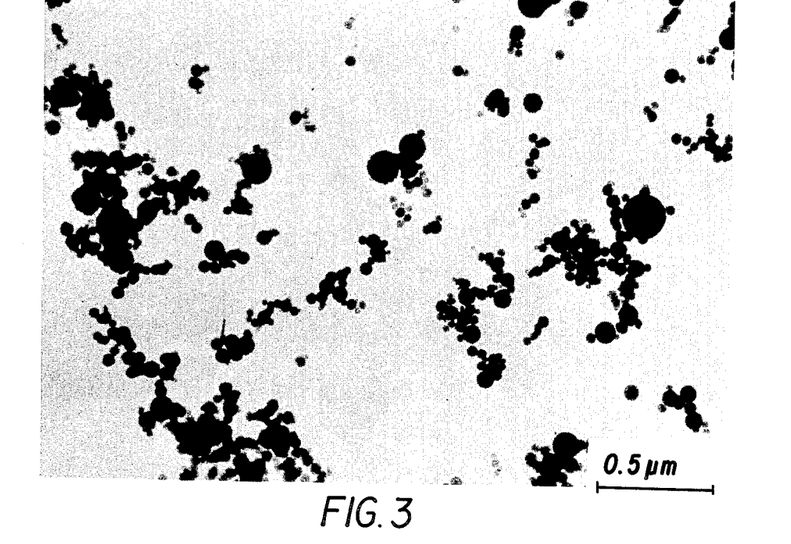
FIG. 3 is a transmission-electron micrograph of the alumina-titania composite powder prepared in Example 1.

A transmission electron microscope photograph (magnification: 50,000) of the powders before the calcination is shown in FIG. 3. The particles were spherical and there were hardly found particles not more than 20 nm or not less than 120 nm. The average particle diameter (average by frequencies) was 39 nm.

The Al$_2$O$_3$-TiO$_2$ composite powders subjected to a pretreatment including the calcination were molded by isostatic pressing under a pressure of 3 ton/cm$^2$.

The sample fully dried was preheated at a temperature of 250° C. for two hours and then subjected to heating for sintering at a rate of 300° C./h and sintering at a temperature of 1300° C. for one hour or at a temperature of 1500° C. for one hour. The density of the sintered bodies was 95.6% for the former and 93.2% for the latter in terms of a relative density which is a percentage with reference to a theoretical density.

Whereas, in the case where calcination was carried out at a temperature of 750° C., no α-phase was observed and the other properties were substantially the same as those subjected to calcination at 800° C.

In this connection, it is to be noted that the properties of the sintered bodies obtained from the Al$_2$O$_3$-TiO$_2$ composite powders in the Examples and Comparative Examples are measured as follows except for those specified before.

The density is determined from the weight and size of the test pieces. This is also true with the molded bodies before sintering. (The density of the test pieces after sintering can also be measured by an Archimedes method using mercury replacement. There is no significant difference in measured results between the former method based on the weight and size and the latter method.)

Although the crystalline phases are different between the molded bodies before sintering, the test pieces sintered at 1000° to 1250° C. and the test pieces sintered at 1300° to 1600° C., the intended sintered bodies are those sintered at a temperature of 1300° C. or higher. Therefore, the theoretical density is calculated on the assumption that the aluminum titanate reaction has fully proceeded and α-Al$_2$O$_3$ or rutile-TiO$_2$ is present together with aluminum titanate when Al$_2$O$_3$ or TiO$_2$ is in excess, respectively. The relative density is given by a percentage with reference to the theoretical density.

As the specific gravities of aluminum titanate, α-Al$_2$O$_3$ and rutile-TiO$_2$ are 3.702, 3.987 and 4.250 g/cm$^3$ (according to JCPDS Powder Diffraction File), respectively, the theoretical densities and relative densities of the sintered bodies prepared from the composite powders consisting of Al$_2$O$_3$ and TiO$_2$ are calculated as follows:

(i) In the case where Al$_2$O$_3$ is in excess of the stoichiometric ratio, if the weight % of Al$_2$O$_3$ is assumed as A, $$\text{Theoretical density} = \frac{1}{\frac{100-A}{43.9 \times 3.702} + \frac{A-56.1}{43.9 \times 3.987}}$$

(ii) In the case where TiO$_2$ is in excess of the theoretical ratio, if the weight % of Al$_2$O$_3$ is assumed as A, $$\text{Theoretical density} = \frac{1}{\frac{A}{56.1 \times 3.702} + \frac{56.1-A}{56.1 \times 4.250}}$$

(iii) The relative density is given by:

$$\text{Relative density} = \frac{\text{Measured density}}{\text{Theoretical density}} \times 100 \ (\%)$$

The X-ray diffractometry is made on sintered surfaces of the sintered bodies, or cut surfaces or fractured surfaces of the test pieces to identify the crystalline phases. Remarkable orientation of the aluminum titanate crystals are seen on the sintered face of the test piece. When the Al$_2$O$_3$-TiO$_2$ composite powders of the present invention are used as starting materials, only little Al$_2$O$_3$ and TiO$_2$ remain unreacted and the reaction for producing aluminum titanate proceeds well because Al$_2$O$_3$ and TiO$_2$ in the starting materials are mixed very well.

A bending strength test for fine ceramics is prescribed in JIS R1601. However, in the case of the present invention where the preparation is carried out on an experimental scale and the product is small, the size of the test piece is reduced to save the powders. In the experiments of the present invention, the size of the test piece is reduced to about 3 mm × 4 mm × 21 mm, the test piece is subjected to three point bending with 16 mm span and the numbers are identical with those of JIS. It should be noted, in addition, that the bending tests are performed with the test pieces as sintered without being further subjected to grinding, because the grinding induces severe microcracking on the surface.

A coefficient of thermal expansion is measured by THERMOFLEX TMA manufactured and sold by Rigaku Denki K.K. in such a way that a test piece of, for example, 3×4×21 mm and a control of quartz of high purity are subjected to temperature increase and decrease of 6° C./h between room temperature and 1000° C. and kept at the highest temperature of 1000° C. for 10 minutes.

EXAMPLE 2

The apparatus was operated under conditions substantially the same as those of Example 1 except that the feeding amounts of AlCl$_3$ and the carrier gas therefor were increased while the feeding amounts of TiCl$_4$ and the carrier gas thereof were decreased. The feeding amounts were as follows:

AlCl$_3$ carrier N$_2$: 0.46Nm$^3$/h
Fed amount of AlCl$_3$: 110 g/h
Fed amount of TiCl$_4$: 45 g/h
TiCl$_4$ carrier N$_2$: 0.36 Nm$^3$/h The powders obtained after one-hour operation of the apparatus were treated under conditions substantially the same as Example 1 to obtain about 35 g of powders. The composition was 69.1 wt % of Al$_2$O$_3$ and 30.9 wt % of TiO$_2$. It was confirmed that each of the particles of the powders contained both Al$_2$O$_3$ and TiO$_2$. The calcination conditions were 850° C. for 30 minutes.

In these powders, only rutile-phase was detected for a crystalline phase of TiO$_2$ and γ-phase and δ-phase for that of Al$_2$O$_3$. No other crystalline phase was detected.

Figure 4:
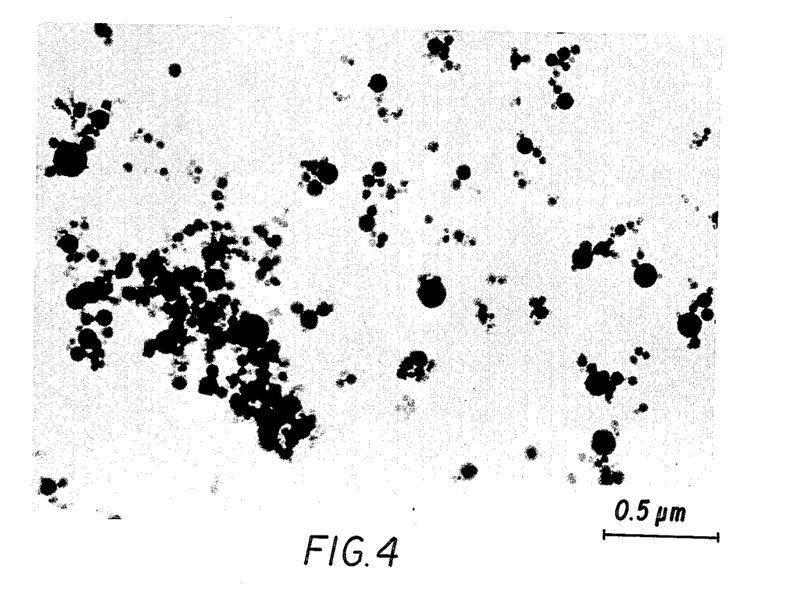
FIG. 4 is a similar transmission-electron micrograph of alumina-titania composite powder prepared in Example 2.

The crystallite diameter of rutile-phase was 12 nm before calcination and 18 nm after calcination. The transmission-electron micrograph (magnification: 50,000) of the powders before calcination is shown in FIG. 4.

The average particle diameter was 33 nm. It was confirmed that the configurations and size distribution of the powders had not been changed between before and after calcination at 850° C. for 30 minutes.

When the powders were molded and sintered in a manner similar to that of Example 1, the density of the sintered bodies, was 94.8% in the case of sintering at 1300° C. for one hour and 94.5% in the case of sintering at 1500° C. for one hour.

EXAMPLES 3, 4 and 5

Powders were prepared in a manner substantially the same as Example 1 except that the fed amounts of AlCl₃ and TiCl₄ were changed as follows. The calcination was conducted at 800° C. for one hour. Thus, three kinds of powders (samples Nos. 3, 4 and 5) were prepared.

Sample No. 3

AlCl₃ carrier N₂: 0.3 Nm³/h
Fed amount of AlCl₃: 70 g/h
Fed amount of TiCl₄: 100 g/h
TiCl₄ carrier N₂: 0.52 Nm³/h

Sample No. 4

AlCl₃ carrier N₂: 0.48 Nm³/h
Fed amount of AlCl₃: 115 g/h
Fed amount of TiCl₄: 40 g/h
TiCl₄ carrier N₂: 0.34 Nm³/h

Sample No. 5

AlCl₃ carrier N₂: 0.36 Nm³/h
Fed amount of AlCl₃: 85 g/h
Fed amount of TiCl₄: 70 g/h
TiCl₄ carrier N₂: 0.46 Nm³/h Each particle of the respective powders contained both Al₂O₃ and TiO₂. The compositions of the respective powders were as follows:

Sample No. 3

Al₂O₃: 40.3 wt %,
TiO₂: 59.6 wt %

Sample No. 4

Al₂O₃: 73.5 wt %,
TiO₂: 26.5 wt %

Sample No. 5

Al₂O₃: 55.9 wt %,
TiO₂: 44.1 wt %

The data for these powders are summarized in Table 1 together with the data for Examples 1 and 2.

TABLE 1

| | Example No. | | | | |
|---|---|---|---|---|---|
| | 1 | 2 | 3 | 4 | 5 |
| Powder-preparing conditions | | | | | |
| Mixing section temp., °C. | 1600 | 1600 | 1600 | 1600 | 1600 |
| Reacting sect. exit temp., °C. | 980 | 980 | 980 | 980 | 980 |
| Total retention time, msec | 75 | 75 | 75 | 75 | 75 |
| Calcination conditions, °C. × h | 800 × 1 | 850 × 0.5 | 800 × 1 | 800 × 1 | 800 × 1 |
| Composition | | | | | |
| Al₂O₃, wt % | 61.8 | 69.1 | 40.3 | 73.5 | 55.9 |
| TiO₂, wt % | 38.2 | 30.9 | 59.6 | 26.5 | 44.1 |
| Average particle diameter (before calcination), nm | 39 | 33 | — | 43 | 40 |
| Crystalline phase | | | | | |
| Al₂O₃ | γ or δ, α* | γ or δ | γ or δ | γ or δ, α* | γ or δ |
| TiO₂ | rutile | rutile | rutile (major) anatase (minor) | rutile | rutile (major) anatase (minor) |
| Rutile crystallite diameter | | | | | |
| (before calcination), nm | 9.4 | 12 | 20 | 12 | 18 |
| (after calcination), nm | 18 | 18 | 27 | 12 | 24 |
| Rutile lattice constant C₀ (Å) | 2.9565 | — | — | 2.9539 | 2.9575 |
| Rate of temp. increase & decrease for sintering, °C./h | 300 | 300 | 300 | 300 | 300 |
| 1300° C. × 1 hour Sintering density, % | 95.6 | 94.8 | 95.9 | 88.3 | 95.5 |
| 1500° C. × 1 hour Sintering density, % | 93.2 | 94.5 | 95.2 | 93.7 | 94.6 |

*The α-phase peaks detected in Examples 1 and 4 were extremely weak.

COMPARATIVE EXAMPLES 1, 2 AND 3

A powder preparing apparatus substantially same as that used in the Examples was used to conduct two experiments in which AlCl₃ alone was fed and TiCl₄ alone was fed, respectively, to prepare powders of Al₂O₃ and TiO₂, respectively.

In the preparation of Al₂O₃, preparation conditions the same as those of Example 1 were employed except for the following:

AlCl₃ vaporizer temperature: 150° C.
AlCl₃ carrier N₂: 0.6 Nm³/h
Fed amount of AlCl₃: 140 g/h
Fed amount of TiCl₄: Not fed
TiCl₄ carrier N₂: 0.22 Nm³/h The reactor was stopped after three-hour operation, when the resultant slurry was recovered from the separating drum. The slurry was allowed to stand for a long time to settle solid components. The supernatant was removed and distilled water was added to make a slurry having a solid content of about 5 wt % and pH of about 2. The slurry was subjected to suction filtration by using a quantitative filter paper 5A (nominal opening 7 μm) to remove foreign matters and coarse grits. Thereafter, the filtrate was subjected to centrifugal separation to separate solids from a liquid. The resultant cake-like solid components were recovered and dried at 80° C. to obtain 145 g of Al₂O₃. The particle diameter of the obtained Al₂O₃ powders was 350 Å.

In the preparation of TiO₂, preparation conditions the same as those of Example 1 were employed except for the following:

AlCl₃ vaporizer temperature: 150° C.
(AlCl₃ were not packed)
AlCl₃ carrier N₂: 0.22 Nm³/h
Fed amount of TiCl₄: 140 g/h
TiCl₄ carrier N₂: 0.6 Nm³/h The reactor was stopped after two-hour operation. The resultant slurry was treated in the same manner as that of Al₂O₃ to obtain 70 g of TiO₂ powders. The particle diameter of the obtained TiO₂ powders was 490 Å.

The so obtained Al₂O₃ and TiO₂ powders were weighed so as to provide compositions of comparative Examples 1, 2 and 3, respectively. The powders were then dispersed and mixed in water and thereafter dried. The powders were subsequently calcined at 800° C. for one hour. The treatment after the calcination was substantially the same as that of Example 1. Three kinds of powders were obtained for Comparative Examples 1, 2 and 3, respectively.

In any one of the powders, crystalline phases of δ-phase for Al₂O₃ and anatrase and rutile for TiO₂ were detected. In Comparative Example 1, the powders had a rutile crystallite diameter of 55 nm which was a little larger than the average particle diameter (arithmetic mean) of rutile-phase TiO₂ and the lattice constant of rutile was 2.9585 Å which was substantially equal to the theoretical value. From these, it is considered that rutile-phase TiO₂ was present in the form of a single-component particle and did not form a two-component particle with Al₂O₃ or did not contain solid solution of Al₂O₃ in TiO₂.

In Comparative Examples 2 and 3, the crystallite diameter and lattice constant of rutile-phase TiO₂ were substantially the same as those of Comparative Example 1.

The powders of Comparative Examples 1, 2 and 3 were molded and sintered in the manner substantially same as that of Example 1.

The densities of the sintered bodies were, in terms of relative densities, 85.2%, 90.3% and 76.5%, respectively, for sintering at 1300° C. for one hour and 79.9%, 90.7% and 88.4%, respectively, for sintering at 1500° C. for one hour.

Figure 5:
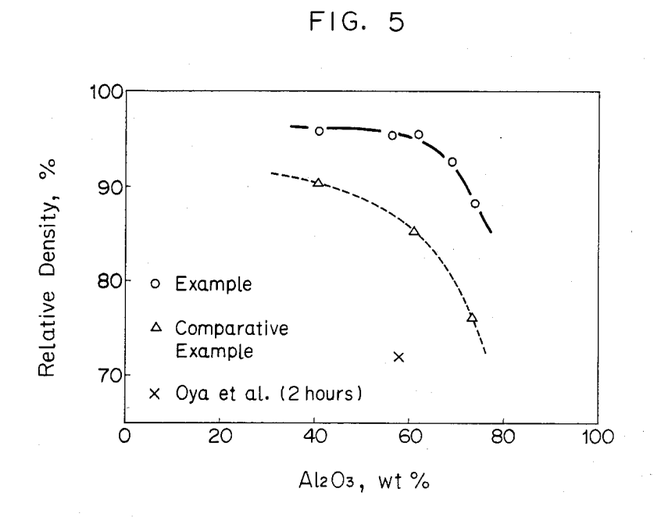
FIG. 5 is a diagram showing a relationship between a relative density and a composition for sintered bodies obtained by sintering at 1300° C. for one hour in Examples 1 to 5 and Comparative Examples 1 to 3.
Figure 6:
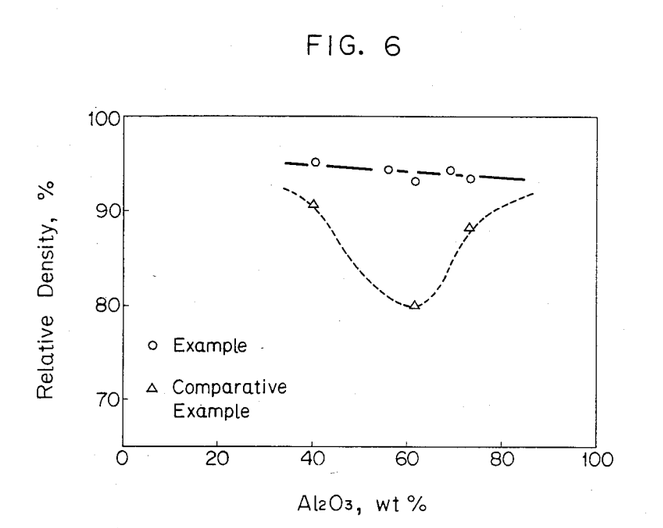
FIG. 6 is a similar diagram showing a relationship between a relative density and a composition for sintered bodies obtained by sintering at 1500° C. for one hour in Examples 1 to 5 and Comparative Examples 1 to 3.

The relationship between the densities of the sintered bodies and the compositions of the powders obtained in Examples 1 to 5 and Comparative Examples 1 to 3 were summarized in FIG. 5 for the sintering at 1300° C. for one hour and in FIG. 6 for the sintering at 1500° C. for one hour.

In the data for the sintering at 1300° C. for one hour, the composite powders of the present invention afforded high density under each of the conditions. The data of the sintering at 1300° C. for two hours for synthesized powders of aluminum titanate by Ohya et al. is also shown, which revealed that this is inferior in sinterability not only to the Examples but to the Comparative Examples.

In the data for the sintering at 1500° C. for one hour, the powders of the present invention showed substantially constant relative densities such as 93 to 95% as far as the experiments concerned. Whereas, the densities were remarkably lowered in the vicinity of stoichiometric ratio of aluminum titanate (Al₂O₃: 56.1 wt %, TiO₂: 43.9 wt %) in Comparative Examples.

As apparent from the data, the sintered bodies prepared from the composite powders of the present invention can attain a high density at a lower sintering temperature and for a shorter sintering time as compared with the conventional ones.

EXAMPLE 6

The powders obtained in Example 1 were sintered at a rate of 600° C./h (10° C./min) and at the highest temperature of 1500° C. for 2 hours. The density of the sintered bodies was 95.5%, the average bending strength was 8.5 Kg/mm² and the coefficient of thermal expansion was 0.137% between room temperature and 1000° C. When the fractured surface was observed by a scanning-electron microscope, Al₂O₃ particles of 0.5 to 3 μm were uniformly dispersed at the interfaces of massive aluminum titanate grains of 5 to 30 μm, which was considered to reinforce the sintered bodies.

EXAMPLE 7

The powders of Example 4 were sintered at a rate of 300° C./h, (5° C./min) and at the highest temperature of 1600° C. for two hours. The density of the sintered bodies was 95.1%, the average bending strength was 11.3 Kg/mm² and the coefficient of thermal expansion was 0.187% between room temperature and 1000° C.

EXAMPLE 8

100 weight parts of powders obtained in Example 5 and 4 weight parts of δ-phase Al₂O₃ used in Comparative Examples were mixed well by a ball mill to prepare starting materials.

The so prepared materials sintered at a rate of 600° C./h (10° C./min) and at the highest temperature of 1500° C. for one hour. The density of the sintered bodies was 95.3%, the average bending strength was 9.0 Kg/mm² and the coefficient of thermal expansion was 0.125% between room temperature and 1000° C.

COMPARATIVE EXAMPLE 4

The powders obtained in Comparative Example 1 were sintered at a rate of 600° C./h (10° C./min) and at the highest temperature of 1500° C. for 2 hours as in Example 6.

The density of the sintered bodies was 83.2%, the average bending strength was 2.6 Kg/mm² and the coefficient of thermal expansion was 0.170% between room temperature and 1000° C. When the fractured surface was inspected by a scanning-electron microscope, a porous structure with domain was observed.

EXAMPLE 9

The powders of Example 3 and the powders of Example 5 were charged in a weight ratio of 1:1 and well mixed by a ball mill to obtain powders having a composition of 48.1 wt % of Al₂O₃ and 51.9 wt % of TiO₂. The powders were sintered at a rate of 600° C./h and at the highest temperature of 1300° C. for four hours. The density of the sintered bodies was 96.8%, the average bending strength was 8.2 Kg/mm² and the coefficient of thermal expansion was 0.078% between room temperature and 1000° C. When the fractured surface was observed by a scanning-electron microscope, TiO₂ particles of 1 to 5 μm were dispersed at the boundaries of massive aluminum titanate grains of 10 to 50 μm. The dispersed TiO₂ particles were considered to reinforce the sintered bodies.

EFFECTS OF THE INVENTION

The aluminum titanate sintered bodies prepared from the $Al_2O_3$-$TiO_2$ composite powders have characteristic features which have not ever been attained.

When the composite powders of the present invention are used as starting materials, aluminum titanate sintered bodies of a high density can be obtained at a relatively low temperature and within a shortened time. Since $Al_2O_3$ and $TiO_2$ are mixed uniformly in the starting materials, aluminum titanate is uniformly produced and $Al_2O_3$ and $TiO_2$ in excess are uniformly dispersed within aluminum titanate. Owing to the high density, the uniformity in structure and the uniform dispersion of the excessive $Al_2O_3$ and $Ti_2$, sufficient strength which has ever been attained can be assured while enjoying a sufficiently low thermal coefficient of expansion, especially, within a range in which $Al_2O_3$ or $TiO_2$ is somehow excessive.

More particularly, the highest density of the aluminum titanate sintered bodies which has been reported is a relative, density of 94.5% which is attained by the sintering at 1500° C. for four hours ( Ohya et al., "Yogyo-Kyokai-shi," 91 (6) 289–297 (1983)). However, when the powders of the present invention are employed, a relative density of 95.5% is obtained by the sintering at 1300° C. for one hour in the case where the composition is equivalent to the stoichiometric ratio. As this is compared with Ohya's 72% attained by the sintering at 1300° C. for two hours, it can be said the composite powders of the present invention are really easily sinterable. By the sintering at 1500° C., 94.6% is attained for one hour. Thus, a higher density can be attained within a shortened time as compared with Ohya.

We claim:

1. Alumina-titania composite powder comprising spherical particles, each of which contains about 30 to 80 wt % of δ-phase or γ-phase alumina and about 70 to 20 wt % of titania comprising rutile-phase in the majority, is substantially free from α-phase and amorphous alumina, and is substantially free from X-phase ($3Al_2O_3$-$TiO_2$) and aluminum titanate-phase.

2. Alumina-titania composite powder according to claim 1, wherein the lattice constant $C_o$ of the rutile-phase titania is 2.9580 Å or less.

3. Alumina-titania composite powder according to claim 1, wherein the average particle diameter is 25 to 100 nm.

4. Alumina-titania composite powder according to claim 1, wherein the average crystal diameter of rutile-phase titania is smaller than both of the average particle diameter of the composite powders and 30 nm.

5. A process for preparing an alumina-titania composite powder comprising spherical particles, each of which contains about 30 to 80 wt. % of δ-phase or γ-phase alumina and about 70 to 20 wt. % of titania comprising rutile-phase in the majority, is substantially free from α-phase and amorphous alumina, and is substantially free from X-phase ($3Al_2O_3$-$TiO_2$) and alumina titanate-phase comprising the steps of:
(a) blowing a vapor mixture of $AlCl_3$ and $TiCl_4$ into a burning flame to effect oxidation, (b) maintaining the temperature of a mixing section, where a combustible gas, an oxidizing gas, $AlCl_3$ gas, $TiCl_4$ gas and a carrier gas are mixed and subjected to combustion at about 1450° C. or higher and lower than the melting point of aluminum titanate, (c) maintaining the temperature of an outlet portion of a reacting section connected to the mixing section of about 800° C. or higher, and (d) providing an average total gas retention time in the mixing section and the reacting section of 20 to 500 msec.

6. A process for preparing an alumina-titania composite powder comprising spherical particles, each of which contains about 30 to 80 wt % of δ-phase or γ-phase alumina and about 70 to 20 wt % of titania comprising rutile-phase in the majority, is substantially free from α-phase and amorphous alumina, and is substantially free from X-phase and amorphous alumina, and is substantially free from X-phase ($3Al_2O_3$-$TiO_2$) and alumina titanate-phase comprising the steps of: (a) blowing a vapor mixture of $AlCl_3$ and $TiCl_4$ into burning flame to effect oxidation, process further comprises (b) maintaining the temperature of a mixing section, where a combustible gas, an oxidizing gas, $AlCl_3$ gas, $TiCl_4$ gas and a carrier gas are mixed and subjected to combustion, at about 1450° C. or higher and lower than the melting point of aluminum titanate, (c) maintaining the temperature of an outlet portion of a reacting section connected to the mixing section at about 800° C. or higher, (d) providing an average total gas retention time in the mixing section and the reacting section of 20 to 500 msec, and (e) subjecting the resustling composite powders to calcination at 700° to 900° C.

* * * * *